(12) United States Patent
Zhang et al.

(10) Patent No.: US 7,864,839 B2
(45) Date of Patent: Jan. 4, 2011

(54) METHOD AND SYSTEM FOR RATE CONTROL IN A VIDEO ENCODER

(75) Inventors: Bo Zhang, Westford, MA (US); Reinhard Schumann, Exeter, NH (US)

(73) Assignee: Broadcom Corporation, Irvine, CA (US)

(*) Notice: Subject to any disclaimer, the term of this patent is extended or adjusted under 35 U.S.C. 154(b) by 1534 days.

(21) Appl. No.: 11/096,467

(22) Filed: Apr. 1, 2005

(65) Prior Publication Data
US 2006/0222063 A1    Oct. 5, 2006

(51) Int. Cl.
*H04N 7/12* (2006.01)
(52) U.S. Cl. ............ 375/240.03; 375/240; 375/240.01; 375/240.12

(58) Field of Classification Search .................. 375/240, 375/240.01, 240.12, 240.13, 240.03; 341/50
See application file for complete search history.

(56) References Cited

U.S. PATENT DOCUMENTS

| 6,192,075 B1* | 2/2001 | Jeng et al. ............... 375/240 |
| 6,256,343 B1* | 7/2001 | Suzuki ..................... 375/240 |
| 6,917,310 B2* | 7/2005 | Pearson et al. ............ 341/50 |

* cited by examiner

*Primary Examiner*—Allen Wong
(74) *Attorney, Agent, or Firm*—McAndrews Held & Malloy, Ltd.

(57) ABSTRACT

Described herein is a rate controller in a video system. The rate controller estimates a bit count, and controls three adaptive rate control loops. The master rate control loop is in control of the quantizer. The slave rate control loops control coarse motion estimation and fine motion estimation.

20 Claims, 6 Drawing Sheets

400

METHOD AND SYSTEM FOR RATE CONTROL IN A VIDEO ENCODER

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In video communications applications it is often necessary to transmit at a fixed bit rate. Extra amounts of information transmitted beyond the fixed bit rate may be lost, and transmitting at a lower bit rate would be a waste of bandwidth. When the bandwidth is wasted, video quality is less than ideal. Similarly, when preparing a video stream for media storage, (e.g. DVD) it is desirable to populate the disk to the maximum capacity such that no disk partition is wasted.

Encoded video takes advantage of spatial and temporal redundancies to achieve compression. Even though video encoders make use of sophisticated algorithms to de-correlate spatial, temporal, and spectral sample dependencies, there are still some hidden statistical redundancies which remain embedded in the stream. Thorough identification of such redundancies is advantageous for reducing the size of the final output video stream. Video compression systems can exploit the statistical redundancies in video sources by entropy encoding. Since video sources are non-stationary in statistical sense, advanced entropy coders can take advantage of context modeling to adapt to changes in the source and achieve better compaction. With advanced entropy encoding, bits output from a video encoder can be delayed by the inherent complexity of this encoding technique.

These and other advantages and novel features of the present invention, as well as illustrated embodiments thereof, will be more fully understood from the following description and drawings.

BRIEF SUMMARY OF THE INVENTION

Described herein are system(s) and method(s) for encoding video data, substantially as shown in and/or described in connection with at least one of the figures, as set forth more completely in the claims.

These and other advantages and novel features of the present invention will be more fully understood from the following description.

DETAILED DESCRIPTION OF THE INVENTION

Figure 1:
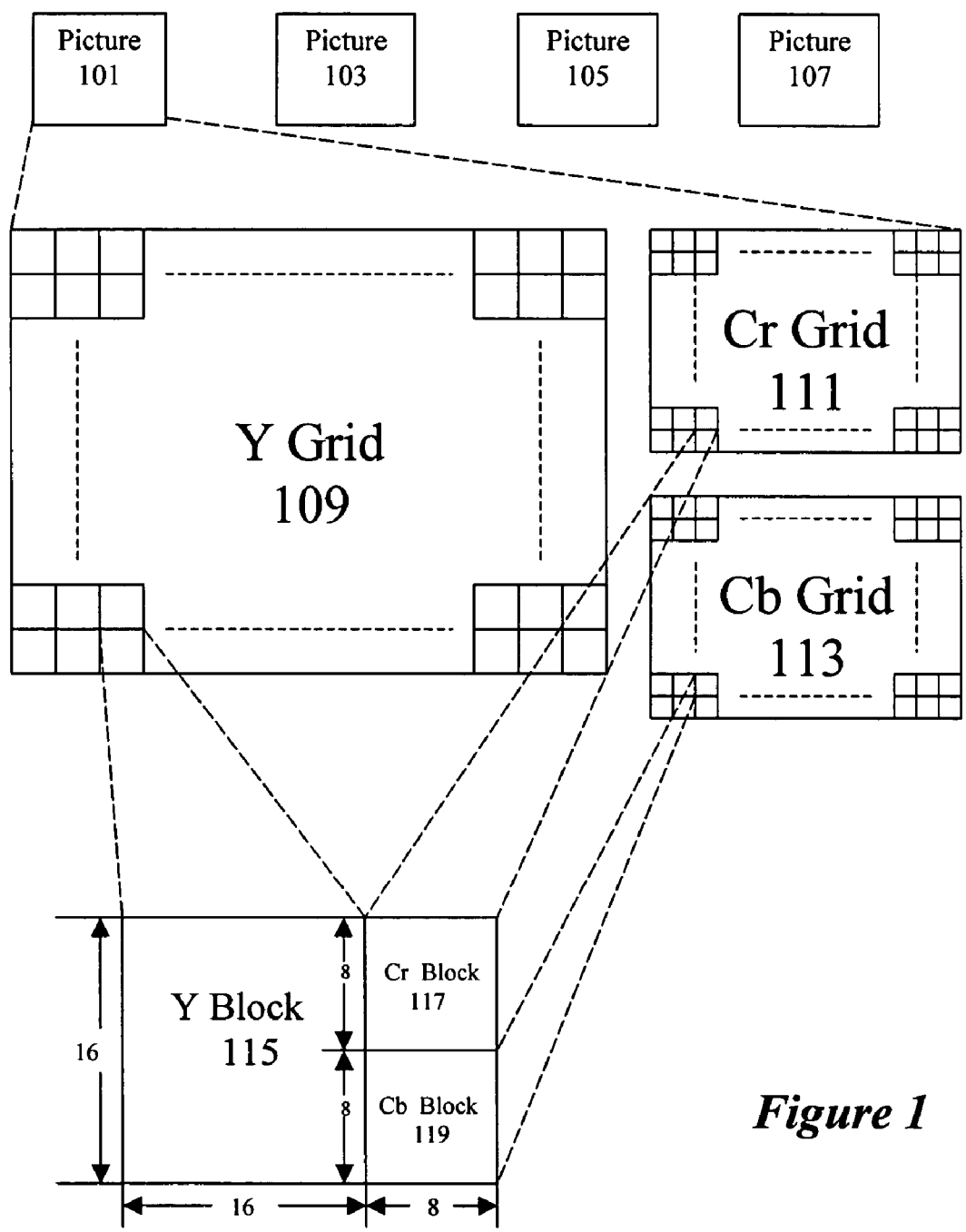
FIG. 1 is a block diagram of an exemplary picture in the H.264 coding standard in accordance with an embodiment of the present invention.

According to certain aspects of the present invention, a system and method for rate control are presented. A target bit rate can be met since an estimate of bit count is generated in real-time even while advanced entropy encoders are enabled.

Most video applications require the compression of digital video for transmission, storage, and data management. A video encoder performs the task of compression. The video encoder takes advantage of spatial, temporal, spectral, and statistical redundancies to achieve compression. An entropy encoder is designed to remove statistical redundancies. The number of bits (or bit rate) in an entropy encoder output should be fed back to a rate controller quickly, but with advanced entropy encoding, the computational complexity may delay the generation of these output bits. If the video encoder cannot estimate an accurate number of bits in real-time with an advanced entropy encoder, the video encoder would have to resort to using a simpler (less efficient) entropy encoder to generate the video encoder output. The use of less efficient entropy encoders reduces the overall compression ratio of a system, and output quality could suffer.

The invention can be applied to video data encoded with a wide variety of standards, one of which is H.264. An overview of H.264 will now be given. A description of an exemplary system for rate control in H.264 will also be given.

H.264 Video Coding Standard

The ITU-T Video Coding Experts Group (VCEG) and the ISO/IEC Moving Picture Experts Group (MPEG) drafted a video coding standard titled ITU-T Recommendation H.264 and ISO/IEC MPEG-4 Advanced Video Coding, which is incorporated herein by reference for all purposes. In the H.264 standard, video is encoded on a macroblock-by-macroblock basis. The generic term "picture" refers to frames and fields.

The specific algorithms used for video encoding and compression form a video-coding layer (VCL), and the protocol for transmitting the VCL is called the Network Access Layer (NAL). The H.264 standard allows a clean interface between the signal processing technology of the VCL and the transport-oriented mechanisms of the NAL, so source-based encoding is unnecessary in networks that may employ multiple standards.

By using the H.264 compression standard, video can be compressed while preserving image quality through a combination of spatial, temporal, and spectral compression techniques. To achieve a given Quality of Service (QoS) within a small data bandwidth, video compression systems exploit the redundancies in video sources to de-correlate spatial, temporal, and spectral sample dependencies. Statistical redundancies that remain embedded in the video stream are distinguished through higher order correlations via entropy coders. Advanced entropy coders can take advantage of context modeling to adapt to changes in the source and achieve better compaction.

An H.264 encoder can generate three types of coded pictures: Intra-coded (I), Predictive (P), and Bi-directional (B) pictures. An I picture is encoded independently of other pictures based on a transformation, quantization, and entropy coding. I pictures are referenced during the encoding of other picture types and are coded with the least amount of compression. P picture coding includes motion compensation with respect to the previous I or P picture. A B picture is an interpolated picture that requires both a past and a future reference picture (I or P). The picture type I uses the exploitation of spatial redundancies while types P and B use exploitations of both spatial and temporal redundancies. Typically, I pictures require more bits than P pictures, and P pictures require more bits than B pictures.

In FIG. 1 there is illustrated a block diagram of an exemplary picture 101. The picture 101 along with successive pictures 103, 105, and 107 form a video sequence. The picture 101 comprises two-dimensional grid(s) of pixels. For color video, each color component is associated with a unique two-dimensional grid of pixels. For example, a picture can include luma, chroma red, and chroma blue components. Accordingly, these components are associated with a luma grid 109, a chroma red grid 111, and a chroma blue grid 113. When the grids 109, 111, 113 are overlaid on a display device, the result is a picture of the field of view at the duration that the picture was captured.

Generally, the human eye is more perceptive to the luma characteristics of video, compared to the chroma red and chroma blue characteristics. Accordingly, there are more pixels in the luma grid 109 compared to the chroma red grid 111 and the chroma blue grid 113. In the H.264 standard, the chroma red grid 111 and the chroma blue grid 113 have half as many pixels as the luma grid 109 in each direction. Therefore, the chroma red grid 111 and the chroma blue grid 113 each have one quarter as many total pixels as the luma grid 109.

The luma grid 109 can be divided into 16×16 pixel blocks. For a luma block 115, there is a corresponding 8×8 chroma red block 117 in the chroma red grid 111 and a corresponding 8×8 chroma blue block 119 in the chroma blue grid 113. Blocks 115, 117, and 119 are collectively known as a macroblock that can be part of a slice group. Currently, sub-sampling is the only color space used in the H.264 specification. This means, a macroblock consist of a 16×16 luminance block 115 and two (sub-sampled) 8×8 chrominance blocks 117 and 118.

Figure 2:
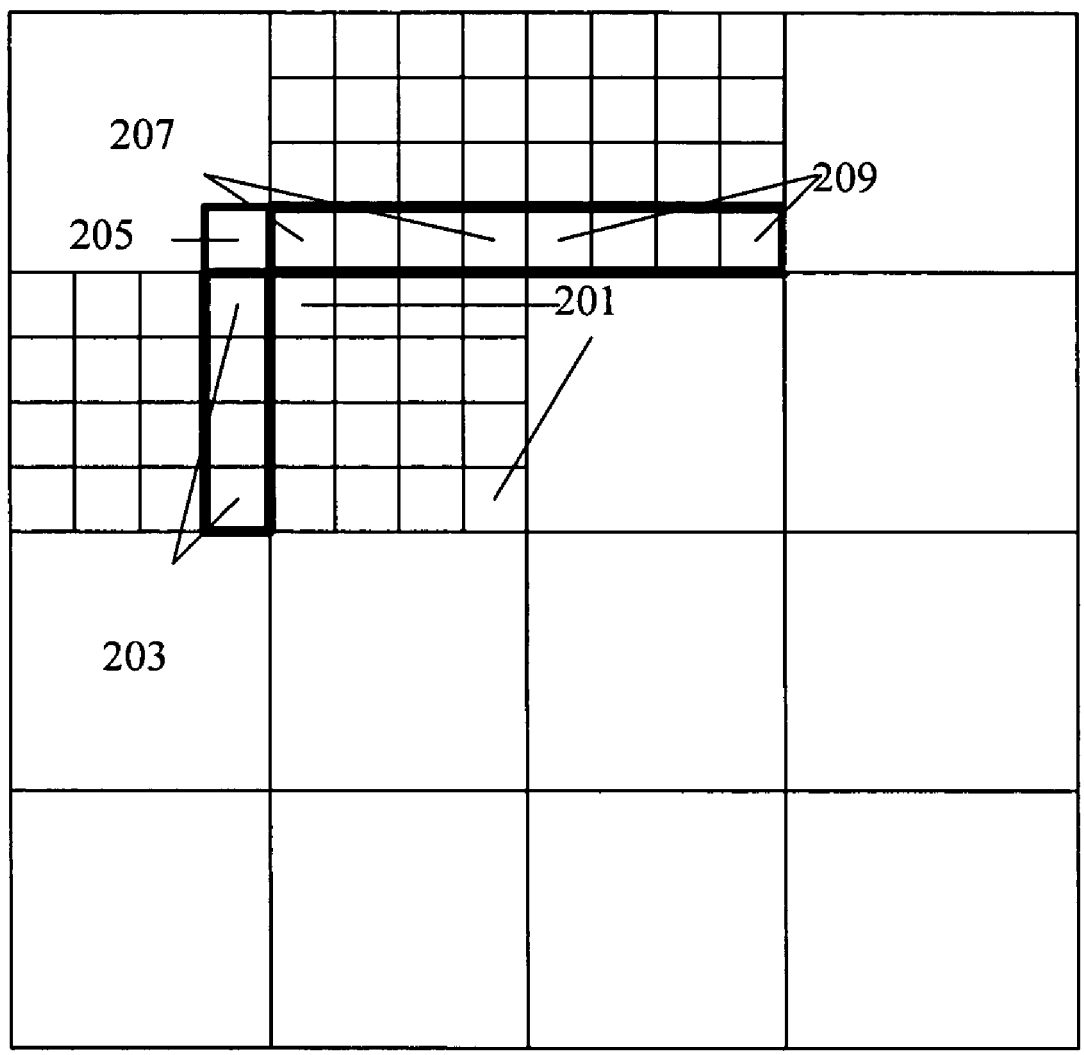
FIG. 2 is a block diagram describing spatially encoded macroblocks in accordance with an embodiment of the present invention.

Referring now to FIG. 2, there is illustrated a block diagram describing spatially encoded macroblocks. Spatial prediction, also referred to as intra-prediction, involves prediction of picture pixels from neighboring pixels. The pixels of a macroblock can be predicted, in a 16×16 mode, an 8×8 mode, or a 4×4 mode. A macroblock is encoded as the combination of the prediction errors representing its partitions.

In the 4×4 mode, a macroblock 201 is divided into 4×4 partitions. The 4×4 partitions of the macroblock 201 are predicted from a combination of left edge partitions 203, a corner partition 205, top edge partitions 207, and top right partitions 209. The difference between the macroblock 201 and prediction pixels in the partitions 203, 205, 207, and 209 is known as the prediction error. The prediction error is encoded along with an identification of the prediction pixels and prediction mode.

Figure 3:
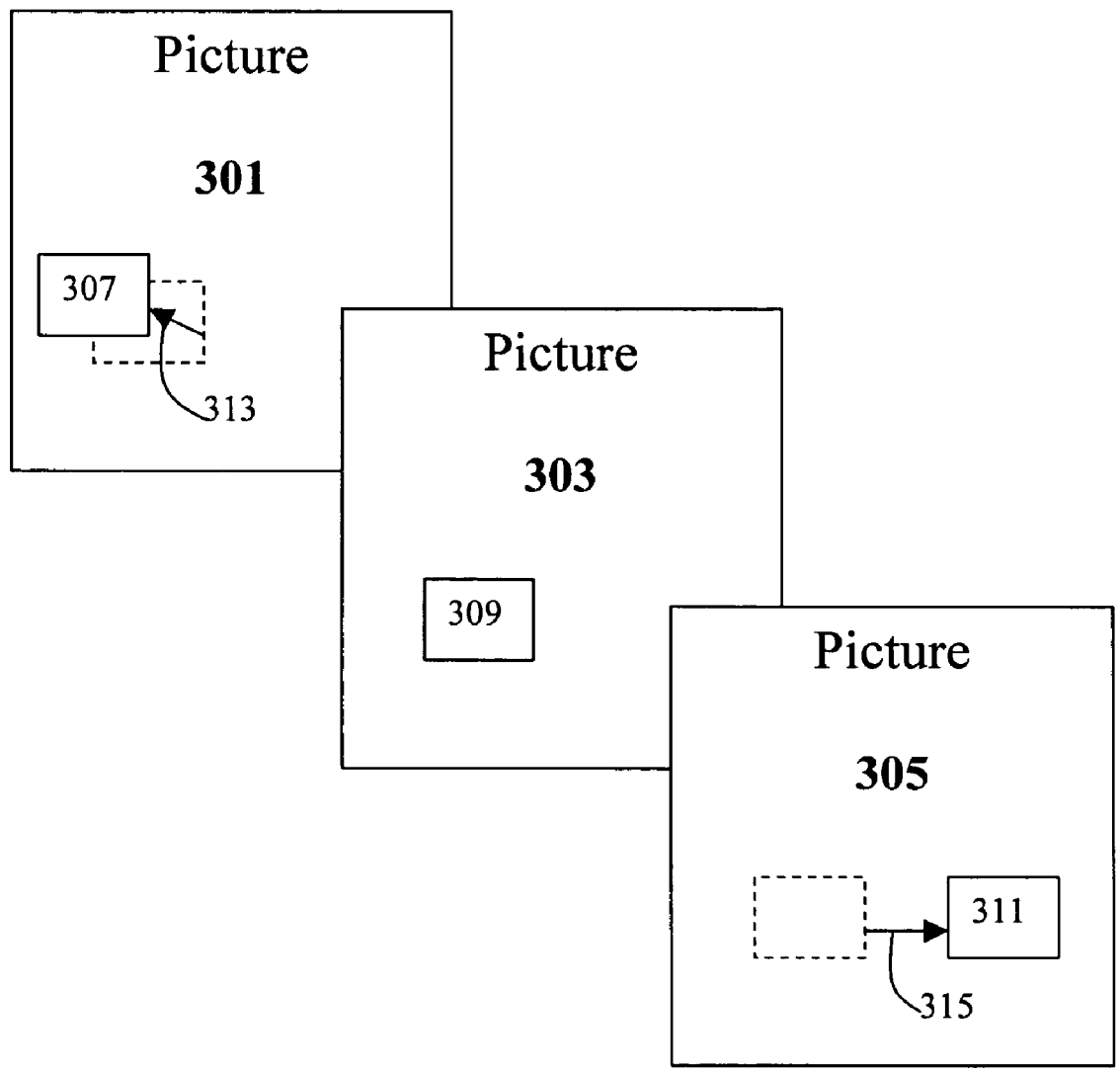
FIG. 3 is a block diagram describing temporally encoded macroblocks in accordance with an embodiment of the present invention.

Referring now to FIG. 3, there is illustrated a block diagram describing temporally encoded macroblocks. In bi-directional coding, a current partition 309 in the current picture 303 is predicted from a reference partition 307 in a previous picture 301 and a reference partition 311 in a latter arriving picture 305. Accordingly, a prediction error is calculated as the difference between the weighted average of the reference partitions 307 and 311 and the current partition 309. The prediction error and an identification of the prediction partitions are encoded. Motion vectors 313 and 315 identify the prediction partitions.

The weights can also be encoded explicitly, or implied from an identification of the picture containing the prediction partitions. The weights can be implied from the distance between the pictures containing the prediction partitions and the picture containing the partition.

Figure 4:
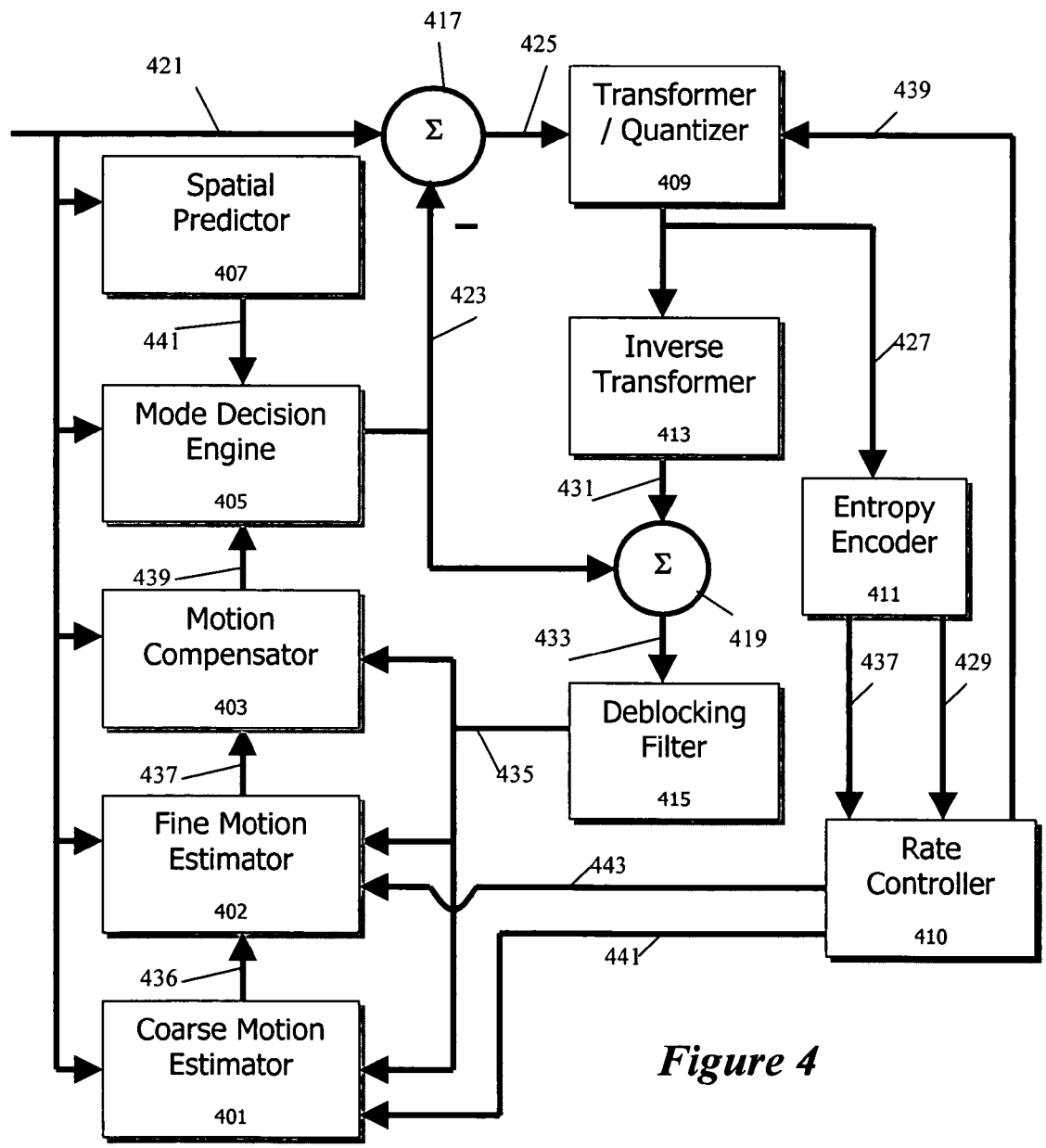
FIG. 4 is a block diagram of an exemplary video encoding system with a rate controller in accordance with an embodiment of the present invention.

Referring now to FIG. 4, there is illustrated a block diagram of an exemplary video encoder 400. The video encoder 400 comprises a coarse motion estimator 401, a fine motion estimator 402, a motion compensator 403, a mode decision engine 405, a spatial predictor 407, a transformer/quantizer 409, an entropy encoder 411, an inverse transformer 413, a rate controller 410, and a deblocking filter 415.

The spatial predictor 407 requires only the contents of a current picture 421 for prediction. The spatial predictor 407 receives the current picture 421 and produces a spatial prediction 441 as described in reference to FIG. 2.

Spatially predicted pictures are intra-coded. Luma macroblocks can be divided into 4×4 blocks or 16×16 blocks. There are 9 prediction modes available for 4×4 macroblocks and 4 prediction modes available for 16×16 macroblocks. Chroma macroblocks are 8×8 blocks and have 4 possible prediction modes.

In the coarse motion estimator 401, the current picture 421 is estimated from one or more reference blocks 435 using a set of motion vectors 437. The coarse motion estimator 401 can operate on sub-sampled pictures by first decimating the current picture 421 and the one or more reference pictures 435. The sub-sampled pictures are used to generate candidate motion vectors 436. Motion vectors describe the spatial displacement between blocks and identify the prediction block(s). Candidate motion vectors 436 can have a resolution of single or double pel (picture element). A rate control parameter 443 allows picture level pipelining.

The fine motion estimator 402 receives the candidate motion vectors 436 to determine search regions in the one or more reference blocks 435. The fine motion estimator 402 can operate on interpolated partitions of a macroblock in the current picture 421. A temporally encoded macroblock can be divided into partitions of size 16×8, 8×16, 8×8, 4×8, 8×4, or 4×4. Each partitions of a macroblock is compared to one or more prediction blocks in a search region in the one or more reference blocks 435 that may be temporally located before or after the current picture. Motion vectors 437 in fine motion estimation can have a quarter pel resolution. A rate control parameter 441 allows macroblock level pipelining.

The motion compensator 403 receives the motion vectors 437 and the current picture 421 and generates a temporal prediction 439. Interpolation can be used to increase accuracy of motion compensation to a quarter of a sample distance. The prediction values at half-sample positions can be obtained by applying a 6-tap FIR filter or a bi-linear interpolator, and prediction values at quarter-sample positions can be generated by averaging samples at the integer- and half-sample positions. The prediction values for the chroma components are typically obtained by bi-linear interpolation. In cases where the motion vector points to an integer-sample position, no interpolation is required. Motion compensation runs along with the main encoding loop to allow intra-prediction macroblock pipelining.

The mode decision engine 405 will receive the spatial prediction 441 and temporal prediction 439 and select the prediction mode according to a sum of absolute transformed difference (SATD) cost that optimizes rate and distortion. A selected prediction 423 is output.

Once the mode is selected, a corresponding prediction error 425 is the difference 417 between the current picture 421 and the selected prediction 423. The transformer/quantizer 409 transforms the prediction error and produces quantized transform coefficients 427. In H.264, there are 52 quantization levels that can be selected with a rate control parameter 439.

Transformation in H.264 utilizes Adaptive Block-size Transforms (ABT). The block size used for transform coding of the prediction error 425 corresponds to the block size used for prediction. The prediction error 425 is transformed independently of the block mode by means of a low-complexity 4×4 matrix that together with an appropriate scaling in the quantization stage approximates the 4×4 Discrete Cosine Transform (DCT). The Transform is applied in both horizontal and vertical directions. When a macroblock is encoded as intra 16×16, the DC coefficients of all 16 4×4 blocks are further transformed with a 4×4 Hardamard Transform.

The quantized transform coefficients 427 are fed into an inverse transformer 413 to produce a regenerated error 431. The original prediction 423 and the regenerated error 431 are summed 419 to regenerate a reference picture 433 that is passed through the deblocking filter 415 and used for motion estimation.

H.264 specifies two types of entropy coding: Context-based Adaptive Binary Arithmetic Coding (CABAC) and Context-based Adaptive Variable-Length Coding (CAVLC). The entropy encoder 411 receives the quantized transform coefficients 427 and produces a video output 429. CABAC typically results in the highest level of compression, but the complexity of CABAC can delay the generation of a bit count that is necessary for the rate controller 410.

Figure 5:
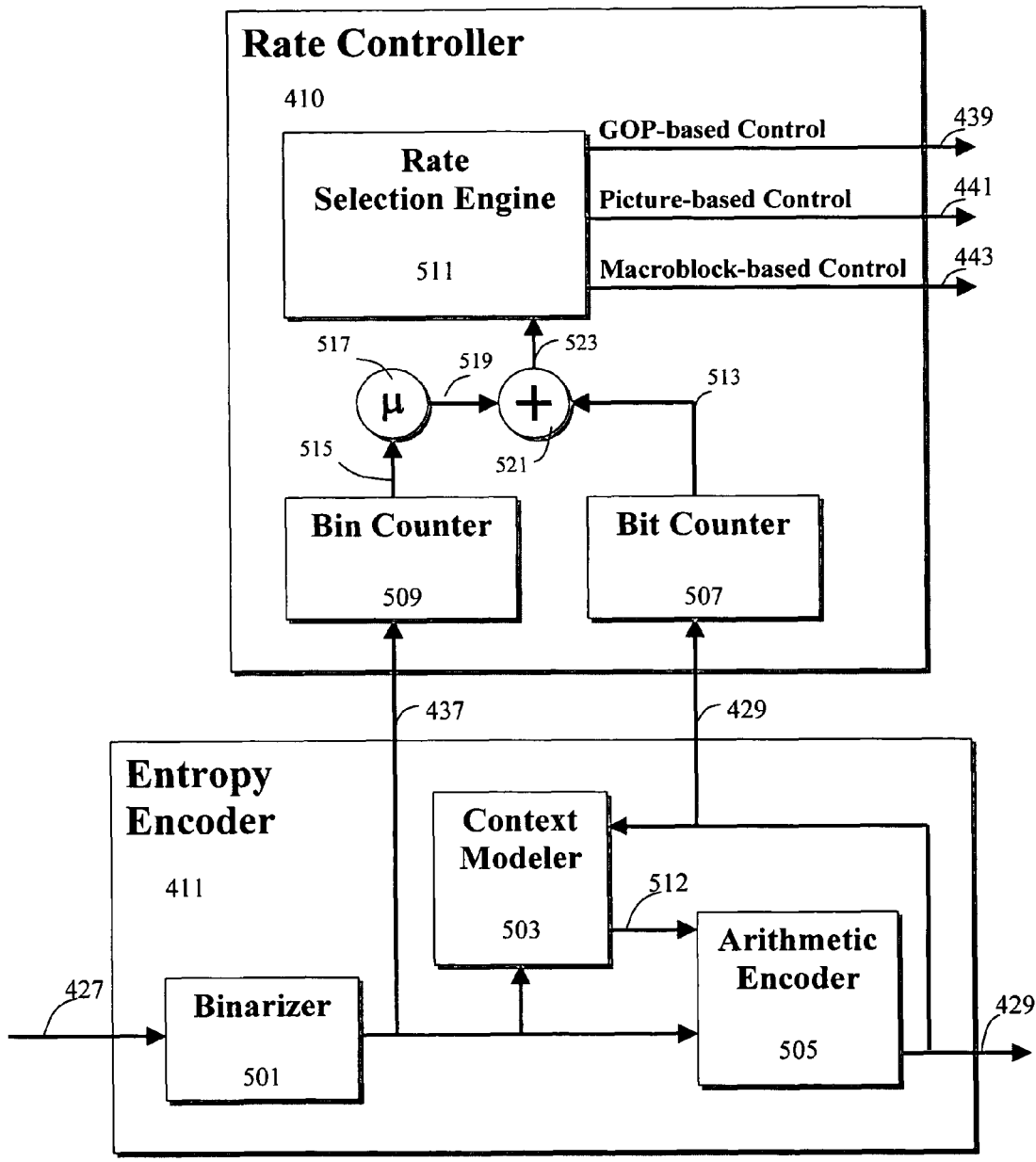
FIG. 5 is a block diagram of a rate controller and an entropy encoder in accordance with an embodiment of the present invention.

Referring now to FIG. 5, a block diagram 500 of the rate controller 410 and the entropy encoder 411 is shown. The entropy encoder 411 includes a binarizer 501, a context modeler 503, and an arithmetic encoder 505. The binarizer 501 converts a non-binary-valued symbol 427 into a bins or bin string 437 prior to the arithmetic encoder 505. Quantized input symbols 427 are reduced in range to create symbols of one's and zeros. The context modeler 503 is used to determine an accurate probability model 512 for one or more bins of the bin string 437. The context modeler 503 samples the input bins 437 and assigns probability models 512 based on a frequency of observed bins. This model 512 may be chosen from a selection of available models depending on the statistics of recently coded data symbols. The context model 512 stores the probability of each bin being "1" or "0". The arithmetic encoder 505 utilizes the context model 512 and assigns bits 429 to input bins 437. There are just two sub-ranges for each bin: corresponding to "0" and "1". Generated bits 429 are embedded in an outgoing video stream. The bits 429 are fed back to context modeler 503 to update probabilities of observed events. For example, if the bit value was "1", the frequency count of "1"s is increased.

The rate controller comprises a bit counter 507, a bin counter 509, and a rate selection engine 511. This entropy encoder output 429 can be available at a time during picture processing. There can be a portion of a picture that has completed entropy encoding and a portion of a picture that has not completed entropy encoding. The bit counter 507 receives the entropy encoder output 429 and generates a bit count 513 for the entropy encoded portion of the picture.

Typically, it is necessary to have an accurate and current estimate of the number of bits in the video encoder output 429 in order to maintain a fixed bit rate, but complex entropy encoding can create a bottleneck or a delay. The complexity of the entropy encoder 411 may be due to silicon technology limitations and the fact that accurate probability models require the processing of a large number of samples. Very large pictures or very high bit rates further advance the delay. Consequently, the encoder output 429 can be delayed from time to time when certain modules of the video encoders would want to sample them instantly.

While the encoder engine or entropy encoder 411 is occupied with digesting the picture or the slice, the rest of the video encoder hardware or software blocks will move forward in time. The rate controller 410 is responsible for meeting a set bit-rate for the compressed video stream. Accessing the bins 437 in the entropy encoder 411 can reduce the feedback delay. A bin counter 509 produces a bin count 515 for the portion of the picture that has not completed entropy encoding. The bin count 515 can be scaled 517 by a value $\mu$ to produce a bit count estimate 519. An example value of $\mu$ is 0.8. The bit count estimate 519 and the bit count 513 are summed 521 to provide an estimate of the bit count 523 for the current picture.

To provide three adaptive rate control parameters 439, 441, and 443, the rate selection engine 511 uses the current picture bit count estimate 523. The master rate control loop controls the quantization level of the input 427 to the entropy encoder 411. The rate control parameter 439 associated with the master loop is based on a group of pictures (GOP) bit count. Slave rate control loop control the coarse and fine motion estimation. The coarse motion estimation rate control parameter 441 is based on a picture-level bit count. The fine motion estimation rate control parameter 443 is based on a macroblock-level bit count.

The functions of the rate controller 410 and the entropy encoder 410 may be implemented in arithmetic logic.

Figure 6:
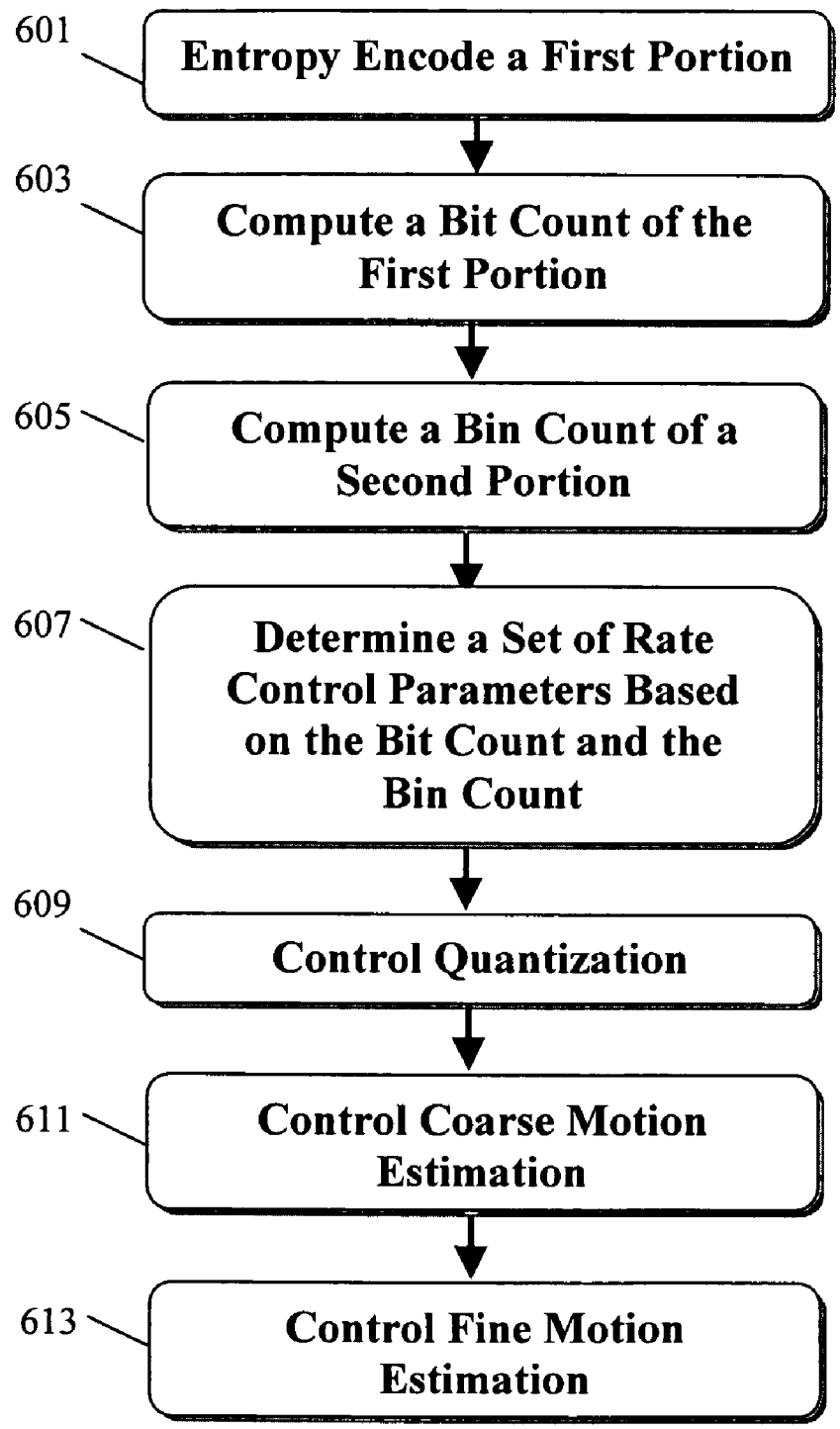
FIG. 6 is a flow diagram of an exemplary method for video encoding with rate control in accordance with an embodiment of the present invention.

FIG. 6 is a flow diagram of an exemplary method for rate control 600. Entropy encode a first portion at 601. This creates a coded portion of a current picture. Compute a bit count of the first portion at 603.

Compute a bin count of a second portion at 605. To produce a bit count estimate, the bin count can be scaled by a value that is between 0 and 1.

Determine a set of rate control parameters based on the bit count and the bin count at 607. The sum of the bit count and the scaled bin count can approximate the bit count of the current picture.

Control quantization at 609. A GOP-level bit count estimate is utilized for this master rate control loop.

Control coarse motion estimation at 611. A picture-level bit count estimate is used for this rate control loop.

Control fine motion estimation at 613. A macroblock-level bit count estimate is used for this rate control loop.

The embodiments described herein may be implemented as a board level product, as a single chip, application specific integrated circuit (ASIC), or with varying levels of a video classification circuit integrated with other portions of the system as separate components.

The degree of integration of the video classification circuit will primarily be determined by the speed and cost considerations. Because of the sophisticated nature of modern processors, it is possible to utilize a commercially available processor, which may be implemented external to an ASIC implementation.

If the processor is available as an ASIC core or logic block, then the commercially available processor can be implemented as part of an ASIC device wherein certain functions can be implemented in firmware as instructions stored in a memory. Alternatively, the functions can be implemented as hardware accelerator units controlled by the processor.

Limitations and disadvantages of conventional and traditional approaches will become apparent to one of ordinary skill in the art through comparison of such systems with the present invention as set forth in the remainder of the present application with reference to the drawings.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. For example, although the invention has been described with a particular emphasis on MPEG-4 encoded video data, the invention can be applied to a video data encoded with a wide variety of standards.

Therefore, it is intended that the present invention not be limited to the particular embodiment disclosed, but that the present invention will include all embodiments falling within the scope of the appended claims.

The invention claimed is:

1. A method for video encoding with rate control, said method comprising:
   computing a bit count for a first encoded portion of a current picture by a circuit;
   computing a bin count for a second encoded portion of the current picture; and
   generating a rate control parameter based on the bit count and the bin count; and
   transforming and quantizing the first encoded portion of the current picture and the second encoded portion of the current picture prior to computing the bit count and computing the bin count.

2. The method of claim 1, wherein generating the rate control parameter further comprises:
   scaling a bin count by a value, thereby producing a bit count estimate, wherein the rate control parameter is a function of the bit count estimate and the bit count.

3. The method of claim 2, wherein generating the rate control parameter is a function of a sum of the bit count estimate and the bit count.

4. The method of claim 1, wherein the method further comprises selecting a quantization level based on the rate control parameter.

5. The method of claim 1, wherein the method further comprises controlling a motion estimation based on the rate control parameter.

6. The method of claim 5, wherein the motion estimation comprises a coarse motion estimation.

7. The method of claim 5, wherein the motion estimation comprises a fine motion estimation.

8. The method of claim 1, further comprising motion estimating the first encoded portion of the current picture and the second encoded portion of the current picture prior computing the bit count and computing the bin count.

9. The method of claim 1, wherein the bit count varies.

10. The method of claim 1, wherein the bins comprise intermediate symbols during conversion of bits to CABAC symbols.

11. A video encoder with rate control, said video encoder comprising:
    a bit counter for computing a bit count for a first encoded portion of a current picture;
    a bin counter for computing a bin count for a second encoded portion of the current picture; and
    a rate controller for generating a first rate control parameter based on a function of the bit count and the bin count, wherein encoding of a future picture is based on the first rate control parameter; and
    wherein the first encoded portion of the current picture and the second encoded portion of the current picture are transformed and quantized prior to the bit counter computing the bit count and the bin counter computing the bin count.

12. The video encoder of claim 11, wherein the bin count is scaled by a value to produce a bit count estimate.

13. The video encoder of claim 12, wherein the rate controller further comprises: an adder for summing the bit count estimate and the bit count.

14. The video encoder of claim 13, wherein the rate controller further comprises: a rate selection engine for determining the first rate control parameter based on a function of the sum of the bit count estimate and the bit count.

15. The video encoder of claim 11, wherein the video encoder further comprises: a motion estimator for receiving a second rate control parameter to control estimation, wherein the second rate control parameter is a slave to the first rate control parameter.

16. The video encoder of claim 15, wherein the motion estimator comprises a coarse motion estimator.

17. The video encoder of claim 15, wherein the motion estimator comprises a fine motion estimator.

18. The video encoder of claim 11, wherein the encoded portion of the current picture and the second encoded portion of the current picture are motion estimated prior to the bit counter computing the bit count and the bin counter computing the bin count.

19. The video encoder of claim 11, wherein the bit count varies.

20. The video encoder of claim 11, wherein the bins comprise intermediate symbols during conversion of bits to CABAC symbols.

* * * * *